United States Patent [19]

Steffens

[11] 4,411,395

[45] Oct. 25, 1983

[54] DOWNRIGGER SWIVEL BASE

[75] Inventor: Charles Steffens, Austin, Tex.

[73] Assignee: Riviera Marine & Tackle Co., Austin, Tex.

[21] Appl. No.: 292,877

[22] Filed: Aug. 14, 1981

[51] Int. Cl.³ .................... A01K 89/015; F16M 11/08
[52] U.S. Cl. .............................. 242/106; 242/84.2 B; 248/425; 248/186; 43/22
[58] Field of Search .................. 242/106, 99, 84.5 R, 242/86.5 R, 84.2 B; 43/22; 248/349, 186, 425

[56] References Cited

U.S. PATENT DOCUMENTS

| | | | |
|---|---|---|---|
| 1,629,939 | 5/1927 | Turner | 248/600 |
| 2,721,604 | 10/1955 | Salvadore | 155/95 |
| 3,081,059 | 3/1963 | Hastings | 248/376 |
| 3,614,016 | 10/1971 | Rieth | 242/106 |
| 3,724,798 | 4/1973 | Lucasey | 248/418 |
| 3,873,054 | 3/1975 | Mckee | 248/371 |
| 3,937,415 | 2/1976 | Prinz | 242/106 |
| 3,975,050 | 8/1976 | Mckee | 297/328 |

Primary Examiner—Stanley N. Gilreath
Assistant Examiner—Lloyd D. Doigan
Attorney, Agent, or Firm—Price, Heneveld, Huizenga & Cooper

[57] ABSTRACT

The swivel mount of the present invention provides a low profile swivel for a deep trolling reel which can be permanently secured to the deck of a vessel and provides incremental rotational adjustment of the deep trolling reel mounted thereto through 360° at 45° intervals in the preferred embodiment. The structure compactness is made possible by the use of interengaging locking mechanism extending upwardly from a base plate to engage a plurality of angularly spaced notches communicating with the outer periphery of an annular groove in a swivel plate pivotally mounted to the base plate. The locking mechanism is spring-loaded and includes a control handle extending outwardly from the base plate to releasably lock the deep troller in a desired position.

14 Claims, 5 Drawing Figures

DOWNRIGGER SWIVEL BASE

BACKGROUND OF THE INVENTION

The present invention relates to downrigger fishing reels and particularly to a swivel base therefor.

Downrigger reels employed for deep trolling for game fish typically are removably secured to the deck of a vessel utilizing a base plate permanently mounted to the vessel with a mounting plate removably securable to the base plate and forming an integral part of the downrigger. U.S. Pat. No. 3,614,016 is illustrative of such structure.

It is frequently desirable, particularly where several downriggers are installed, for example on the transom area of a vessel, to position the booms of the downriggers at different angles. One swivel structure which has permitted such mounting is in the form of a pair of telescopic tubes, the inner tube has a plurality of aligned holes drilled therethrough and the outer tube includes a spring loaded pin which can be extended into the pivoted inner tube at any one of the desired holes for securing the inner tube, to which the downrigger is attached, in one of many positions. Another approach employs a pair of coaxially interfitting cylindrical drums which are constrained to rotate with respect to one another within an arc of about 90° and include a frictional brake therebetween for securing the drums. The inner drum is secured to the deck of a vessel while the downrigger is secured to the outer drum. In order to fix the position within the 90° arc of adjustability, it is necessary however to remove the deep trolling reel to gain access to the axially mounted frictional brake.

Both of these prior devices are extremely bulky and undesirably raise the downrigger a significant distance off the mounting surface of the vessel.

SUMMARY OF THE PRESENT INVENTION

The swivel mount of the present invention provides a very low profile swivel support for a deep trolling reel or downrigger which can be permanently secured to the deck of a vessel and provides for incremental rotational adjustment of the downrigger mounted thereto through 360° in the preferred embodiment. The compactness of the structure is made possible by the use of a unique interengaging means extending upwardly from a base plate to engage angularly spaced locking means communicating with the outer periphery of an annular groove in a swivel plate pivotally mounted to the base plate. The locking means is spring-loaded and includes a control handle extending outwardly from the base plate to releasably lock a downrigger secured to the swivel plate in a desired position.

Such structure provides an improved, low profile and compact package permitting easy angular adjustment of a downrigger with respect to the vessel on which it is mounted. These and other features, objects and advantages of the present invention will become apparent upon reading the following description thereof together with reference to the accompanying drawings in which:

DETAILED DESCRIPTION OF THE PREFERRED EMBODIMENT

Figure 1:
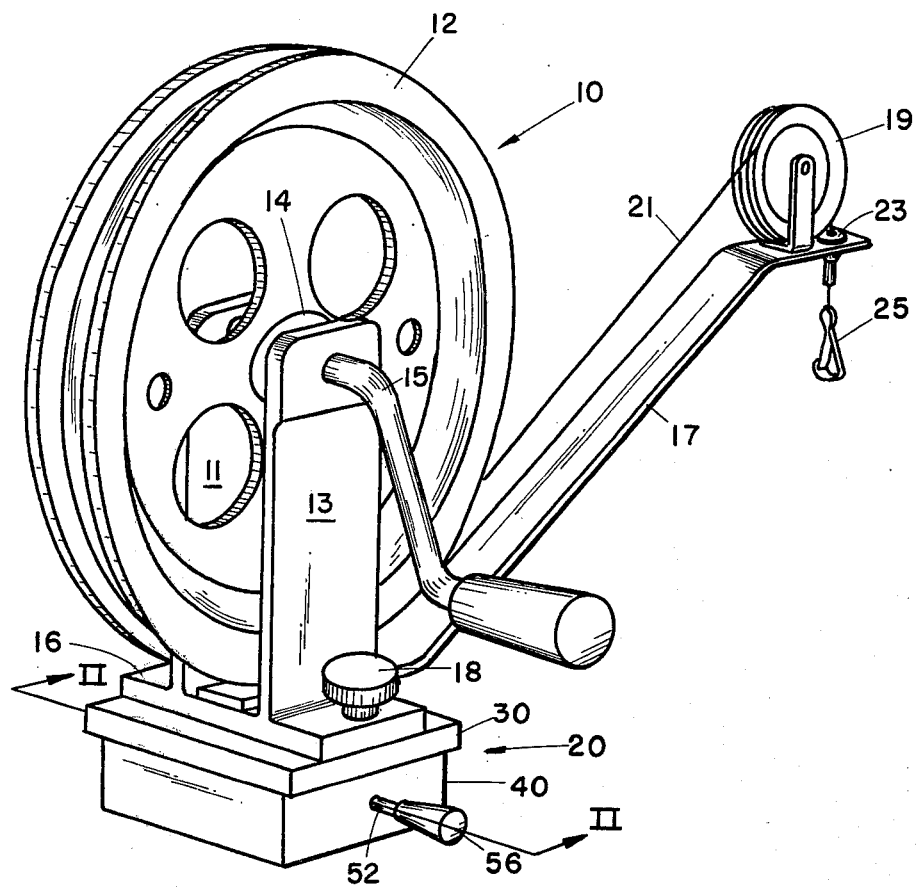
FIG. 1 is a perspective view of the present invention.

Referring initially to FIG. 1, there is shown a downrigger 10 mounted to the swivel base assembly 20 of the present invention. Downrigger 10 includes a relatively large diameter reel 12 rotatably supported between a pair of vertically extending brackets 11 and 13 by bearing means 14. An axle extends between members 11 and 13 and is integral with a crank arm and handle 15 for rotating reel 12 between supports 11 and 13. The support brackets 11 and 13 extend downwardly to a mounting plate 16 which can be removably mounted to the swivel plate assembly 20 by means of a pair of threaded mounting knobs 18.

Extending from plate 16 is a boom 17 supporting a pulley 19 at its end remote from plate 16 for paying out and retrieving a deep trolling line 21 from reel 12 into the water. Typically, line 21 will extend through a ferrule 23 at the end of boom 17 and include a snap clip 25 at its free end for securing a deep trolling weight thereto. The reel assembly 10 is described in greater detail in the above identified U.S. Pat. No. 3,614,016, the disclosure of which is incorporated herein by reference.

The swivel base assembly 20 includes a swivel plate 30 and a base plate 40. Plate 40 is secured to the transom or other convenient locations on a vessel, while plate 16, integrally associated with the downrigger 10, is removably secured to swivel plate 30, which in turn can rotate on a vertical axis with respect to plate 40 to one of a number of angular positions such that boom 17 can be directed to a desired location with respect to the mounting position of the downrigger.

Figure 2:
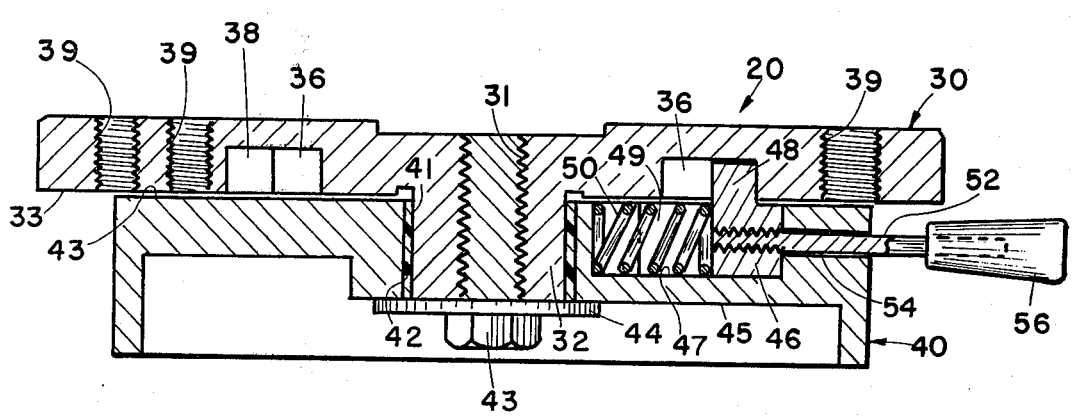
FIG. 2 is an enlarged vertical cross-sectional view of the swivel mount shown in FIG. 1 taken along section line II—II of FIG. 1.
Figure 3:
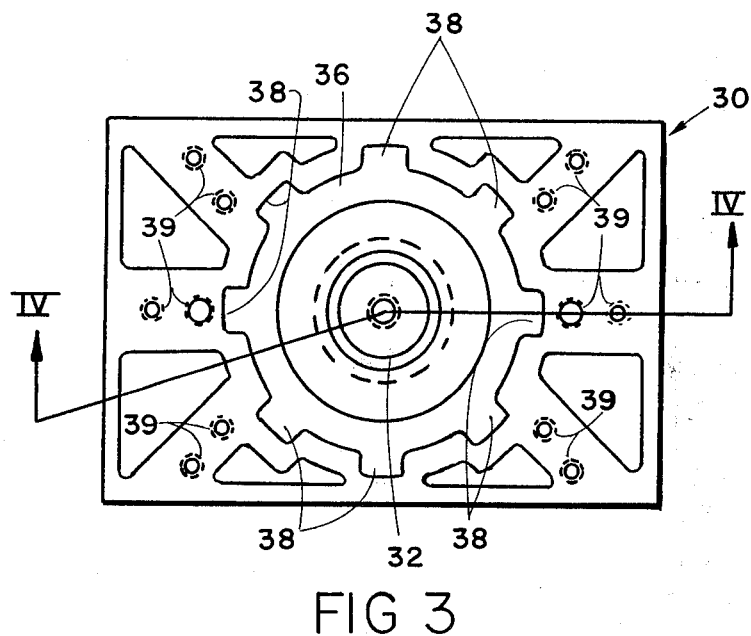
FIG. 3 is a bottom plan view of the swivel plate shown in FIGS. 1 and 2.
Figure 4:
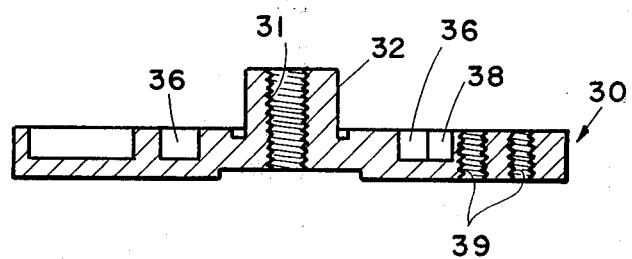
FIG. 4 is a cross-sectional view of the swivel plate taken along section line IV—IV of FIG. 3.

As seen in FIGS. 2-4, swivel plate 30 includes a centrally located, downwardly projecting, cylindrical collar 32 which fits within a cylindrical bore 42, formed in base plate 40. Between collar 32 and bore 42 there is positioned a sleeve bearing 41 made of, for example, sintered bronze. As best seen in FIG. 2, plate 30 is secured to plate 40 by means of a bolt 43 secured within a threaded aperture 31 in collar 32 and a washer 44 which engages the undersurface 45 of plate 40. The lower surface area 33 of swivel plate 30 engages the upper surface 43 of mounting plate 40 and, if desired, a lubricant such as silicone or the like may be placed between the adjacent mating surfaces to facilitate swiveling of the downrigger.

Figure 5:
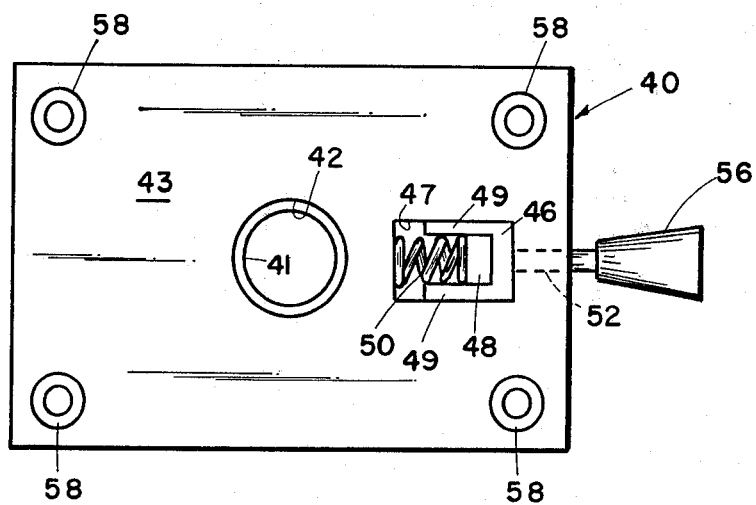
FIG. 5 is a top plan view of the base plate shown in FIG. 1.

Formed upwardly through the bottom of plate 30 is an annular recess 36 including eight, equally spaced, radially, outwardly projecting notches 38 formed in the preferred embodiment at 45° angular positions to provide eight discrete pivotal adjustment points for the swivel plate. Extending into notches 38, for locking the swivel plate 30 with respect to base 40, is a locking dog 48 which is a segment integral with a slide 46 mounted within a recess 47 formed downwardly through the top surface 43 of plate 40. A compression spring 50 extends from the inner wall of recess 47 against the rear surface of slide member 46 to urge it into a locking position, as shown in FIG. 5. Secured to slide 46 is a shaft 52 extending outwardly through an aperture 54 in plate 40 and terminating in a handle 56. Slide 46 includes a pair of legs 49 extending laterally on opposite sides of spring 50, as best seen in FIG. 5, to cradle and secure the spring to member 46. Recess 47 also can be lubricated with a material such as silicone to facilitate sliding motion of slide 46 with respect to the recess. Naturally, dog 48 has a dimension narrower than that of the width of annular recess 36 to permit plate 30 to move freely with respect to plate 40 when handle 56 is moved inwardly. Spring 50 will urge handle 56 outwardly such that the dog 48 will automatically snap into the next available slot 38 as the swivel plate 30 is rotated.

To change the rotational adjusted position of plate 30 with respect to base 40, handle 56 is pressed inwardly, thereby disengaging dog 48 from a slot 38 such that dog 48 extends within the annular recess 36, thereby permitting the free rotation of plate 30 with respect to base 40 until such time as handle 56 is released and the dog 48 engages another notch 38, formed in the outer peripheral rim of recess 36. In order to secure mounting plate 16, of the downrigger, to swivel plate 30, a plurality of threaded apertures 39 are provided at spaced locations on the swivel plate to accommodate different sized downriggers.

In the preferred embodiment of the invention, the swivel plate 30 and the mounting plate 40 are cast of a suitable material such as aluminum and relieved, as shown, to reduce material costs and weight of the assembly. As seen in FIG. 5, mounting plate 40 includes a plurality of apertures 58 located in the corners of the rectangular plate for securing the plate to the deck or transom of a vessel.

Although the system of the preferred embodiment shows eight discrete adjustment locations for swivel plate 30 with respect to mounting plate 40, as can be appreciated, the peripheral rim of groove 36 can, for example, be formed of vertical serrations with correspondingly shaped serrations in the outer periphery of dog 48 such that the angular adjustment can be virtually infinite. Similarly, the number of notches 38 can be reduced, if desired. These and other modifications to the preferred embodiment, as disclosed herein, can be made by those skilled in the art without departing from the spirit or scope of the invention as defined by the appended claims.

The embodiments of the invention in which an exclusive property or privilege is claimed are defined as follows.

1. A swivel assembly for mounting a downrigger to a vessel comprising:
   a base plate including means for securing said plate to a vessel, said plate having an upper surface and a first recess formed downwardly in said plate through said upper surface, interengaging means movably positioned in said recess and including a portion extending above said upper surface;
   a swivel plate rotatably secured to said base plate and including a lower surface facing said upper surface of said base plate, said swivel plate including a second recess for receiving said portion of said interengaging means to permit relative rotation of said swivel plate with respect to said base plate when said interengaging means is in a first position, said swivel plate including locking means communicating with said second recess; and
   means for moving said interengaging means to a second position in which said portion of said interengaging means contacts said locking means to prevent rotation of said swivel plate with respect to said base plate.

2. The apparatus as defined in claim 1 wherein said interengaging means comprises a slide positioned in said first recess and wherein said portion of said interengaging means comprises an upwardly extending segment of said slide.

3. The apparatus as defined in claim 2 wherein said locking means comprises a plurality of spaced notches shaped to cooperatively interengage said segment of said slide.

4. The apparatus as defined in claim 3 wherein said means for moving said interengaging means comprises an arm coupled to said slide and extending outwardly from said base plate.

5. The apparatus as defined in claim 4 wherein said means for moving said interengaging means further includes bias means extending between said first recess and said slide for urging said slide in said second position.

6. The apparatus as defined in claim 5 wherein said segment of said slide comprises a generally rectangular member and wherein said second recess is an annular recess and said notches comprise a plurality of equally spaced rectangular notches formed in an outer peripheral sidewall of said annular recess.

7. The apparatus as defined in claim 6 wherein said locking means includes eight notches spaced at 45° intervals formed in said sidewall of said annular recess.

8. A downrigger including a swivel assembly for mounting said downrigger to a vessel comprising:
   a reel for paying out and retrieving line, said reel supported by bracket means extending upwardly from a mounting plate;
   boom means extending outwardly from said mounting plate and including means for passing said line through an end of said boom remote from said mounting plate;
   a base plate including means for securing said plate to a vessel, said plate having an upper surface and a recess formed downwardly in said plate through said upper surface, interengaging means movably positioned in said recess and extending above said upper surface;
   a swivel plate rotatably secured to said base plate and including a lower surface facing said upper surface of said base plate, said swivel plate including an annular recess for receiving the segment of said interengaging means extending above said base plate to permit relative rotation of said swivel plate with respect to said base plate when said interengaging means is in a first position, said swivel plate including locking means communicating with said annular recess;
   means for moving said interengaging means to a second position in which said segment of said interengaging means engages said locking means to prevent rotation of said swivel plate with respect to said base plate; and
   means for securing said mounting plate to said swivel plate.

9. The apparatus as defined in claim 8 wherein said interengaging means comprises a slide positioned in said recess.

10. The apparatus as defined in claim 9 wherein said interengaging means includes an integral segment extending into said annular recess and said locking means comprises a plurality of spaced notches shaped to cooperatively interengage said segment of said slide.

11. The apparatus as defined in claim 10 wherein said means for moving said interengaging means comprises an arm coupled to said slide and extending outwardly from said base plate.

12. The apparatus as defined in claim 11 wherein said means for moving said interengaging means further includes bias means extending between said recess and said slide for urging said slide in said second position.

13. The apparatus as defined in claim 12 wherein said segment of said slide comprises a generally rectangular member and wherein said notches comprise a plurality of equally spaced rectangular notches formed in a sidewall of said annular recess.

14. The apparatus as defined in claim 13 wherein said locking means includes eight notches spaced at 45° intervals formed in said sidewall of said annular recess.

* * * * *